(12) United States Patent
Liang

(10) Patent No.: US 12,375,823 B2
(45) Date of Patent: Jul. 29, 2025

(54) DYNAMIC VISION SENSOR, METHOD FOR SENSING DYNAMIC VISION, AND DYNAMIC VISION CAMERA

(71) Applicant: TRIPLE WIN TECHNOLOGY(SHENZHEN) CO.LTD., Shenzhen (CN)

(72) Inventor: Ho-Kai Liang, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 169 days.

(21) Appl. No.: 18/222,507

(22) Filed: Jul. 17, 2023

(65) Prior Publication Data

US 2024/0357249 A1    Oct. 24, 2024

(30) Foreign Application Priority Data

Apr. 20, 2023   (CN) .......................... 202310453902.X

(51) Int. Cl.
*H04N 25/47*     (2023.01)
*H04N 23/55*     (2023.01)

(52) U.S. Cl.
CPC ............. *H04N 25/47* (2023.01); *H04N 23/55* (2023.01)

(58) Field of Classification Search
CPC ............................... H04N 23/55; H04N 25/47
See application file for complete search history.

(56) References Cited

U.S. PATENT DOCUMENTS

| | | | | |
|---|---|---|---|---|
| 2013/0016275 A1* | 1/2013 | Hokoi | ................. | H04N 25/611 |
| | | | | 348/E7.001 |
| 2019/0075226 A1* | 3/2019 | Koishi | ................. | H04N 25/79 |
| 2021/0116705 A1* | 4/2021 | Kang | ................. | G02B 27/0025 |
| 2021/0127101 A1* | 4/2021 | Roh | ................. | H04N 23/55 |
| 2024/0142752 A1* | 5/2024 | Wong | ................. | H04N 23/55 |

FOREIGN PATENT DOCUMENTS

| | | |
|---|---|---|
| CN | 102844705 A | 12/2012 |
| CN | 111220090 A | 6/2020 |
| CN | 113344878 A | 9/2021 |

\* cited by examiner

*Primary Examiner* — Amy R Hsu
(74) *Attorney, Agent, or Firm* — ScienBiziP, P.C.

(57) ABSTRACT

A dynamic vision sensor includes a dispersion lens and a sensor. The dispersion lens is configured to disperse an incident polychromatic light into monochromatic lights with different colors. The incident polychromatic light is reflected from a color subject to be captured. The monochromatic lights with different colors form blur circles, and areas of the blur circles have different sizes on the sensor. The sensor is configured to output a first event signal according to a variation of an energy corresponding to a variation of a kind of a blur circle. The kind of the blur circle is determined according to the sizes of the areas of the blur circles, and different sizes of the areas of the blur circles correspond to different kinds of the blur circles. A dynamic vision camera and a method for sensing dynamic vision are also disclosed.

17 Claims, 15 Drawing Sheets

DYNAMIC VISION SENSOR, METHOD FOR SENSING DYNAMIC VISION, AND DYNAMIC VISION CAMERA

FIELD

The subject matter herein generally relates to an image capturing technology, and particularly to a dynamic vision sensor, a method for sensing dynamic vision, and a dynamic vision camera.

BACKGROUND

Now, a commercial dynamic vision sensor is mainly configured to capture one or more dynamics of a luminance (gray scale) of a black-and-white subject to be captured. The commercial dynamic vision sensor is difficult to capture the one or more dynamics of the luminance (gray scale) of a color subject to be captured.

SUMMARY

An embodiment of the present application provides a dynamic vision sensor, a method for sensing dynamic vision, and a dynamic vision camera capable of accurately capturing one or more dynamics of a color subject to be captured.

In a first aspect, an embodiment of the present application provides a dynamic vision sensor. The dynamic vision sensor includes a dispersion lens and a sensor. The dispersion lens is configured to disperse an incident polychromatic light into monochromatic lights with different colors. The incident polychromatic light is reflected from a color subject to be captured. The monochromatic lights with different colors form blur circles on the sensor, and areas of the blur circles have different sizes on the sensor. The sensor is configured to output a first event signal according to a variation of an energy corresponding to a variation of a kind of one of the blur circles. Where the kind of the one of the blur circles is determined according to one or more of the sizes of one or more of the areas of one or more of the blur circles, and different sizes of the areas of the blur circles correspond to different kinds of the blur circles.

The dynamic vision sensor includes the dispersion lens and the sensor. The incident polychromatic light reflected from the color subject to be captured enters into the dynamic vision sensor. The dispersion lens is configured to disperse the incident polychromatic light into monochromatic lights with different colors. The monochromatic lights with different colors form blur circles on the sensor, and areas of the blur circles have different sizes on the sensor. The blur circles with the same size of the area belong to a kind of the blur circle. The color subject to be captured includes a junction area of different colors and an individual color area. When the color subject to be captured moves, a first kind of the blur circle which is formed on the sensor by the polychromatic light reflected from the junction area of different colors, is different from a second kind of the blur circle which is formed on the sensor by the monochromatic light reflected from the individual color area. The sensor outputs a first event signal according to the variation of the kind of one of the blur circles, thus the dynamics of the color subject to be captured can be accurately captured.

According to some embodiments of the present application, the sensor includes a plurality of pixels. Each of the pixels is configured to output a second event signal according to a variation of an energy corresponding to the variation of a number of the kind of the one of the blur circles.

The color subject to be captured includes the junction area of different colors and an individual color area. When the color subject to be captured moves, a first number of the kind of the blur circle is different from a second number of the kind of the blur circle. The first number of the kind of the blur circle is formed on the second sensor by the polychromatic light reflected from the junction area of different colors. The second number of the kind of the blur circle is formed on the second sensor by the monochromatic light reflected from the individual color area. Namely, the number of the kind of the blur circle received by the second sensor can be changed. The second sensor outputs the second event signal according to the variation of the number of the kind of the blur circle, thus the dynamics of the color subject to be captured can be captured.

According to some embodiments of the present application, each of the pixels is further configured to output a positive event signal according to the variation of the energy corresponding to an increasing of the number of the kind of the one of the blur circles. Each of the pixels is further configured to output a negative event signal according to the variation of the energy corresponding to a decreasing of the number of the kind of the one of the blur circles.

According to some embodiments of the present application, each of the pixels is further configured to output the positive event signal when an increasing of the energy corresponding to the increasing of the number of the kind of the one of the blur circles is greater than a positive threshold.

According to some embodiments of the present application, each of the pixels is further configured to output the negative event signal when a decreasing of the energy corresponding to the decreasing of the number of the kind of the one of the blur circles is greater than a negative threshold.

According to some embodiments of the present application, the size of the area of the one of the blur circles formed by each of the monochromatic lights is greater than or equal to a size of an area of one of the pixels.

In a second aspect, an embodiment of the present application provides a dynamic vision camera. The dynamic vision camera includes a dynamic vision sensor. The dynamic vision sensor is configured to output an event signal according to an incident polychromatic light reflected from a color subject to be captured. The dynamic vision sensor includes a dispersion lens and a sensor. The dispersion lens is configured to disperse an incident polychromatic light into monochromatic lights with different colors. The incident polychromatic light is reflected from the color subject to be captured. The monochromatic lights with different colors form blur circles on the sensor, and areas of the blur circles have different sizes on the sensor. The sensor is configured to output a first event signal according to a variation of an energy corresponding to a variation of a kind of one of the blur circles. Where the kind of the one of the blur circles is determined according to one or more of the sizes of one or more of the areas of one or more of the blur circles. Different sizes of the areas of the blur circles correspond to different kinds of the blur circles.

According to some embodiments of the present application, the dynamic vision camera further includes a processor. The processor is configured to generate spectral information according to the event signal. The processor is further configured to generate an image of the color subject to be captured according to the spectral information and position information of the color subject to be captured.

According to some embodiments of the present application, the processor is further configured to generate the spectral information which is a bright point according to a positive event signal. The processor is further configured to generate the spectral information which is a dark point according to a negative event signal.

In a third aspect, an embodiment of the present application provides a method for sensing dynamic vision. The method for sensing dynamic vision is applied on a dynamic vision sensor. The dynamic vision sensor is provided with a dispersion lens and a sensor. The method receives an incident polychromatic light reflected from a color subject to be captured and dispersing the incident polychromatic light into monochromatic lights with different colors by a dispersion lens. Where the monochromatic lights with different colors form blur circles on the sensor, and areas of the blur circles have different sizes on the sensor. The method further outputs a first event signal according to a variation of an energy corresponding to a variation of a kind of one of the blur circles by the sensor. Where the kind of the one of the blur circles is determined according to one or more of the sizes of one or more of the areas of one or more of the blur circles, and different sizes of the areas of the blur circles correspond to different kinds of the blur circles.

The dynamic vision sensor includes the dispersion lens and the sensor. The incident polychromatic light reflected from the color subject to be captured enters into the dynamic vision sensor. The dispersion lens is configured to disperse the incident polychromatic light into monochromatic lights with different colors. The monochromatic lights with different colors form blur circles on the sensor, and areas of the blur circles have different sizes on the sensor. The blur circles with the same size of the area belong to a kind of the blur circle. The color subject to be captured includes a junction area of different colors and an individual color area. When the color subject to be captured moves, a first kind of the blur circle which is formed on the sensor by the polychromatic light reflected from the junction area of different colors, is different from a second kind of the blur circle which is formed on the sensor by the monochromatic light reflected from the individual color area. The sensor outputs the first event signal according to the variation of the kind of one of the blur circles, thus the dynamics of the color subject to be captured can be accurately captured.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

"A plurality of" in this application means two or more. In the descriptions of this application, terms such as "first" and "second" are merely used for distinction and description, and should not be understood as an indication or implication of relative importance or an indication or implication of an order.

In addition, the term "for example" in the embodiments of this application is used to represent giving an example, an illustration, or a description. Any embodiment or implementation solution described as an "example" in this application should not be explained as being more preferred or having more advantages than another embodiment or implementation solution. Exactly, the term "example" is used to present a concept in a specific manner.

An explanation and a description of related terms is as follows.

A dynamic vision sensor (DVS) is an image sensor configured to capture one or more dynamics of a subject.

One or more subjects to be captured are one or more subjects captured by the DVS. The subjects to be captured includes one or more objects, an environment, and so on.

An in-focus plane is a plane capable of focusing when the DVS is focusing. An out-of-focus plane is other planes whose position is different from a position of the in-focal plane.

A single monochromatic light emitted from a certain point of the out-of-focus plane will fall on different points of the sensor. The different points form a blur circle. A term of the blur circle is called a circle of confusion.

An energy can be an illumination intensity or a brightness. When a polychromatic light is a visible light, the energy can be the illumination intensity. When the polychromatic light is an invisible light, the energy can be the illumination intensity or the brightness. Where, a unit of the illumination intensity is Lux or lx. A unit of the brightness is nit or $cd/m^2$.

A gray scale represents a luminance grade of an image from the brightest to the darkest.

A first DVS is a commercial DVS, and a second DVS is a DVS of an instant application. A first sensor is a sensor of the first DVS. A first pixel is a pixel of the first sensor. A first prism is a prism of the first DVS. A first concave lens is a concave lens of the first DVS. A second sensor is the sensor of the second DVS. A second pixel is the pixel of the second sensor. A second prism and a third prism each is the prism of the second DVS. A second concave lens is the concave lens of the second DVS.

A brief description of related technologies is as follows.

Now, a commercial dynamic vision sensor is mainly configured to capture one or more dynamics of a luminance (gray scale) of a black-and-white subject to be captured. The commercial dynamic vision sensor is difficult to capture the one or more dynamics of the luminance (gray scale) of a color subject to be captured.

Figure 1:
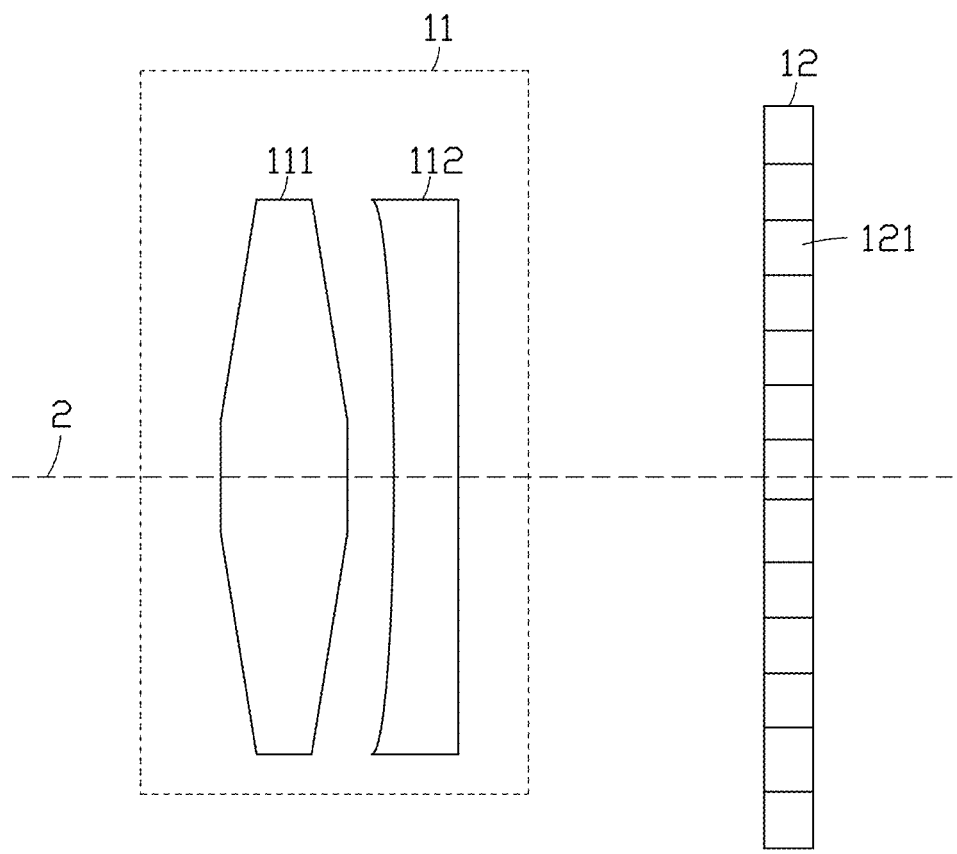
FIG. 1 is a schematic structural view of a commercial dynamic vision sensor of an embodiment.
Figure 2:
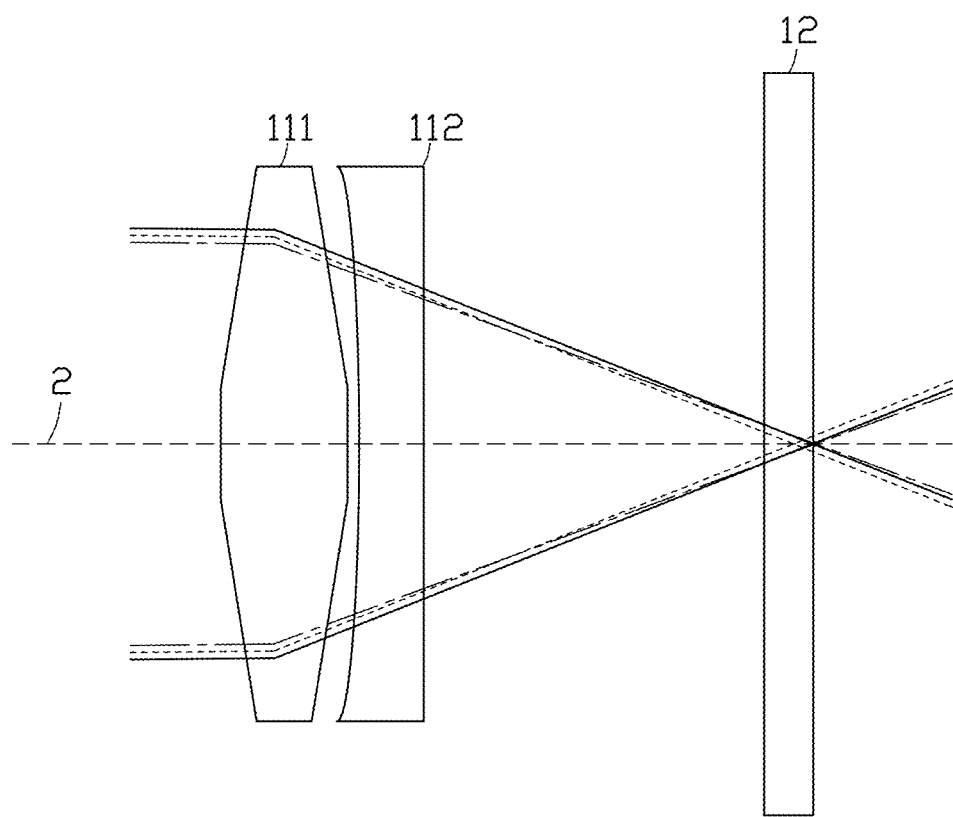
FIG. 2 is an application scenario view of a commercial dynamic vision sensor of an embodiment.

A schematic structural view of a commercial DVS, namely a schematic structural view of the first DVS is shown as FIG. 1. The first DVS 1 includes a lens 11 and the first sensor 12. The lens 11 and the first sensor 12 are orderly arranged along an incident optical axis 2 of an incident polychromatic light. The lens 11 includes a first prism 111 and a first concave lens 112. The first prism 111 and the first concave lens 112 are orderly arranged along the incident optical axis 2 of the incident polychromatic light. The first prism 111 is configured to disperse the polychromatic light into a number of monochromatic lights with a number of colors. The first concave lens 112 is configured to eliminate a longitudinal chromatic aberration of the monochromatic lights on the incident optical axis 2. Thus, sizes of areas of the blur circles formed by the different monochromatic lights on the first sensor 12 are closes to each other. For example, the size of the area of the blur circle formed by a blue monochromatic light on the first sensor 12 is close to a size of an area of a green monochromatic light on the first sensor 12. Referring also to FIG. 2, FIG. 2 is an application scenario view of the first DVS 1. The color subject to be captured includes three colors. The light can be reflected by the color subject to be captured, and to form the polychromatic light with three colors. The polychromatic light can be dispersed into the monochromatic lights with three colors after the polychromatic light passing through the first prism 111. The longitudinal chromatic aberration of the monochromatic light with three colors can be corrected via the monochromatic light with three colors passing through the first concave lens 112. Thus, the longitudinal chromatic aberration of the monochromatic lights with three colors on the incident optical axis 2 can be eliminated, thus the sizes of the areas of the blur circles formed by the monochromatic lights with three colors on the first sensor 12 are close to each other.

Figure 3A:
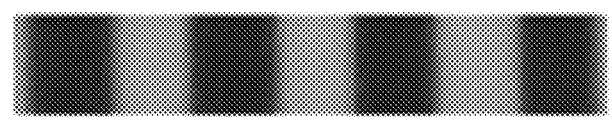
FIG. 3A, FIG. 3B, and FIG. 3C are application scenario views of a commercial dynamic vision sensor of another embodiment.
Figure 3B:
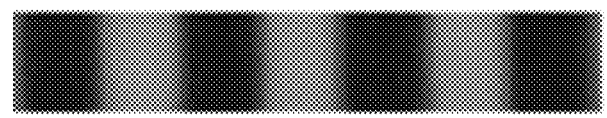
Figure 3C:
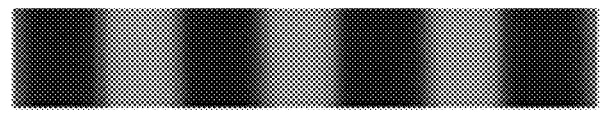

Referring also to FIG. 3A-FIG. 3C, the first DVS 1 captures the dynamics of the color subject to be captured, and switches different aperture values. As shown in FIG. 3A, a first image of a number of pixels is captured by the first DVS 1 when an aperture value of the first DVS 1 is a first value. As shown in FIG. 3B, a second image of the pixels is captured by the first DVS 1 when the aperture value of the first DVS 1 is a second value. As shown in FIG. 3C, a third image of the pixels is captured by the first DVS 1 when the aperture value of the first DVS 1 is a third value.

It can be understood that, at different aperture values, the lens 11 of the first DVS 1 causes the sizes of the areas of the blur circles to be close to each other. Thus, a boundary between each two adjacent pixels of the color subject to be captured in the image is clear. Namely, there is no chromatic aberration in the image. Thus, the longitudinal chromatic aberration can be corrected.

Referring back to the FIG. 1, the first sensor 12 is configured to receive the energy of the polychromatic light. The first sensor 12 includes a number of first pixels 121. Each first pixel 121 of the first sensor 12 includes a corresponding positive threshold and a corresponding negative threshold. When the color subject to be captured moves, the light reflected by the color subject to be captured enters into the first DVS 1. When a variation value of an increasing energy of the light received by the first pixel 121 is greater than a positive threshold, the first pixel 121 outputs a positive event signal (+Event). When the variation value of a decreasing energy of the light received by the first pixel 121 is greater than a negative threshold, the first pixel 121 outputs a negative event signal (−Event).

Figure 4:
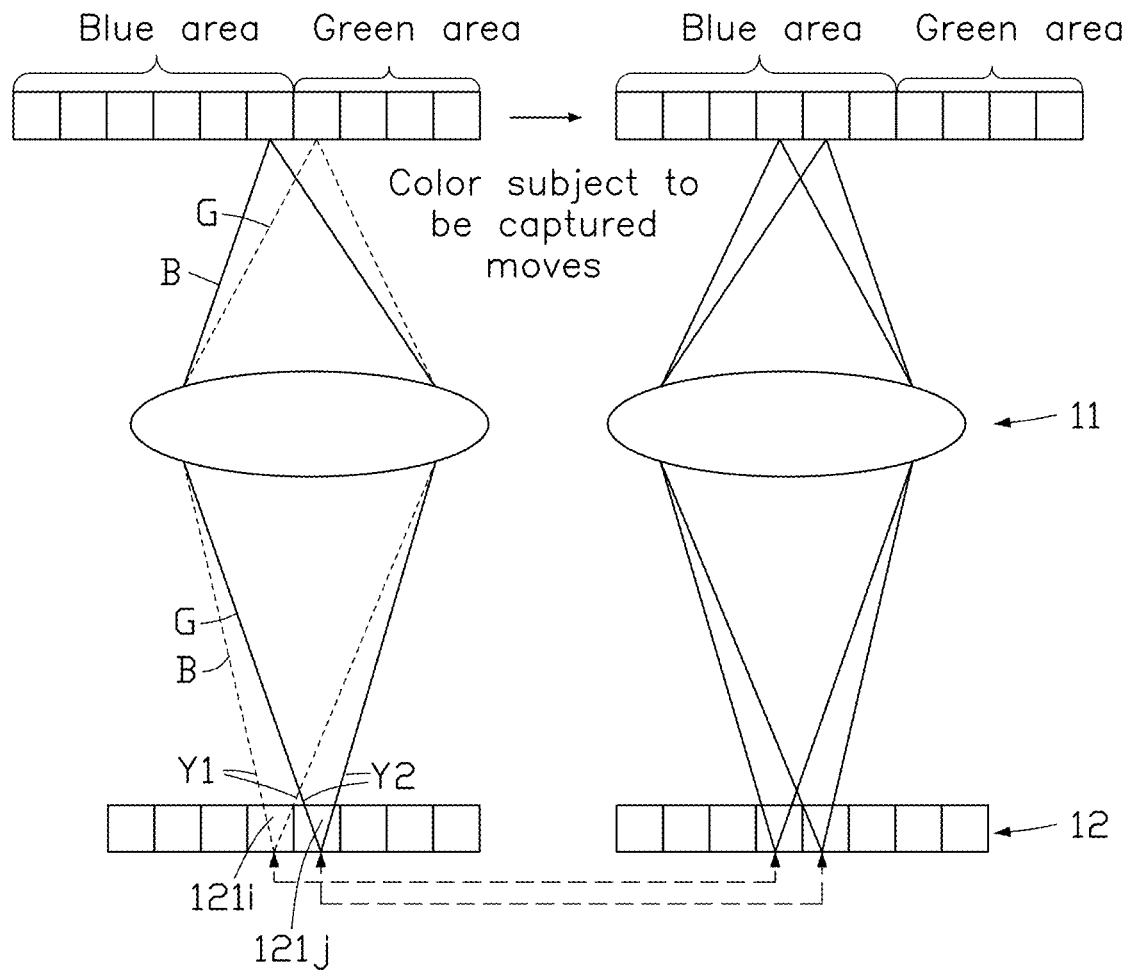
FIG. 4 is an application scenario view of a commercial dynamic vision sensor of another embodiment.

Referring to FIG. 4, in one embodiment, the first sensor 12 of the first DVS 1 includes a first pixel 121 at an i position (hereinafter a first pixel 121$i$) and a first pixel 121 at a j position (hereinafter a first pixel 121$j$). The positive threshold of the first pixel 121$i$ is N/3, the negative threshold of the first pixel 121$i$ is N/9, the positive threshold of the first pixel 121$j$ is N/2, and the negative threshold of the first pixel 121$j$ is N/10. The color subject to be captured includes a blue area and a green area. When the color subject to be captured is at a first position, the light is irradiated to the color subject to be captured. The light reflected from the blue area is a blue monochromatic light B, and the light reflected from the green area is a green monochromatic light G. The blue monochromatic light B and the green monochromatic light G form the polychromatic light. The polychromatic light enters into the first sensor 12. The first pixel 121$i$ receives a blur circle Y1, and a size of the blur circle Y1 is the area of one pixel. The blur circle Y1 is formed on the first sensor 12 by the green monochromatic light G. The first pixel 121$j$ receives a blur circle Y2, and the size of the blur circle Y2 is the area of one pixel. The blur circle Y2 is formed on the first sensor 12 by the blue monochromatic light B. Namely, the energy received by the first pixel 121$i$ and the energy received by the first pixel 121$j$ are the same. The energy corresponding to the blue monochromatic light B received by the first pixel 121$i$ is N, and the energy corresponding to the green monochromatic light G received by the first pixel 121$j$ is also N. When the color subject to be captured moves to a second position, the light is irradiated to the color subject to be captured. The light reflected from the blue area of the color subject to be captured is the blue monochromatic light B, and the light reflected from the green area of the color subject to be captured is the green monochromatic light G. Because the first DVS 1 does not move and the color subject to be captured moves, the blue monochromatic light B enters into the first pixel 121$i$ and the first pixel 121$j$ of the first DVS 1. The first pixel 121$i$ and the first pixel 121$j$ each receive the blur circle Y2, and a size of the blur circle Y2 is the area of one pixel. The blur circle Y2 is formed by the blue monochromatic light on the first sensor 12. Namely, the energies corresponding to the blue monochromatic light received by the first pixel 121$i$ and the first pixel 121$j$ each is N.

Figure 5A:
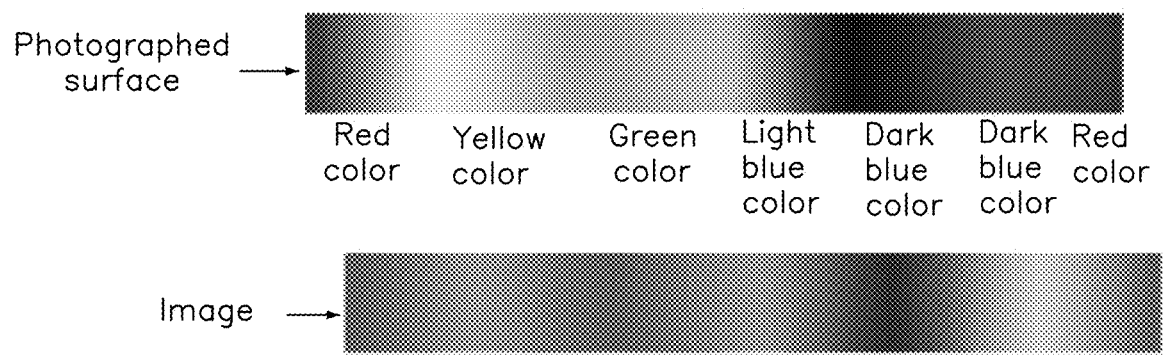
FIG. 5A and FIG. 5B are application scenario views of a commercial dynamic vision sensor of another embodiment.
Figure 5B:
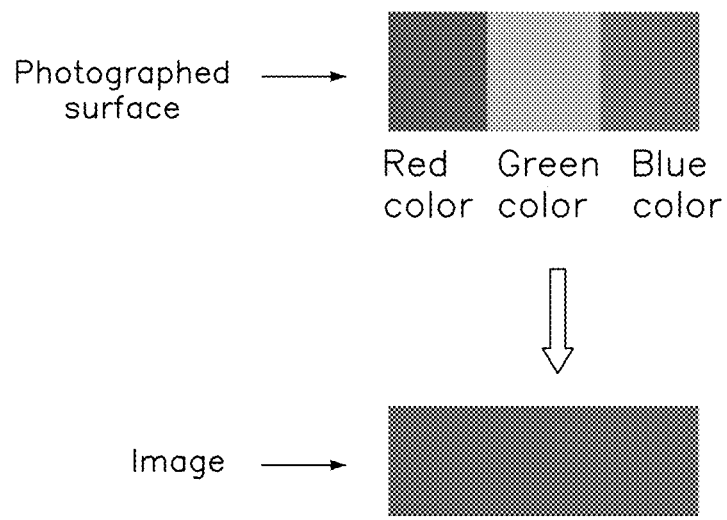

It can be understood that, the energies formed on the pixels by a junction of the blue monochromatic light and the green monochromatic light (namely when the color subject to be captured is at the first position, the energies received by the first pixel 121$i$ and the first pixel 121$j$) are respectively the same as the energies formed on the pixels by the blue monochromatic light (namely when the color subject to be captured is at the second position, the energies received by the first pixel 121$i$ and the energy received by the first pixel 121$j$) or the energies formed on the pixels by the green monochromatic light, and the energies each is N. When the color subject to be captured moves from the first position to the second position, the energy received by the first pixel 121$i$ and the energy received by the first pixel 121$j$ each does not change. The positive event signal and/or the negative event signal is not generated. Thus, a processor cannot generate one-dimensional spectral information which is a bright point or a dark point, and the variation at a junction area of different colors of the color subject to be captured cannot be captured, thereof the dynamic of the color subject to be captured cannot be captured. As shown in FIG. 5A, a photographed surface of the subject to be captured includes a number of color ramps, for example, a red color, a yellow color, a green color, a light blue color, a dark blue color, a pink color, and a red color. At the moment, the bright and the dark in the image captured by the first DVS 1 cannot accurately show a distinction between seven color areas. As shown in FIG. 5B, the photographed surface of the subject to be captured includes three colors, respectively the red color, the green color, and the blue color. At the moment, the image captured by the first DVS 1 includes a luminance grade (gray scale), and the image cannot accurately show a distinction between three color areas.

The disclosure provides a DVS, a dynamic vision camera, and a method for sensing dynamic vision capable of accurately capturing the dynamics of the color subject to be captured.

Figure 6:
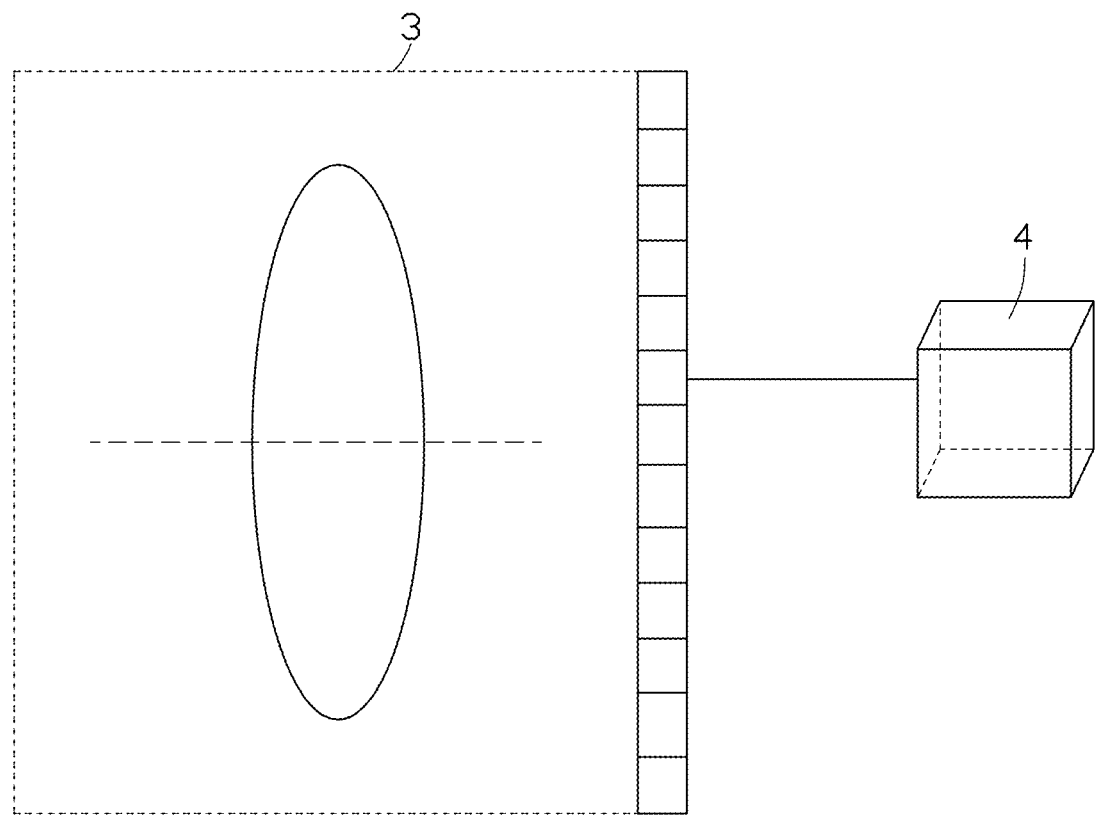
FIG. 6 is a schematic structural view of a dynamic vision camera of an embodiment of a present application.
Figure 14:
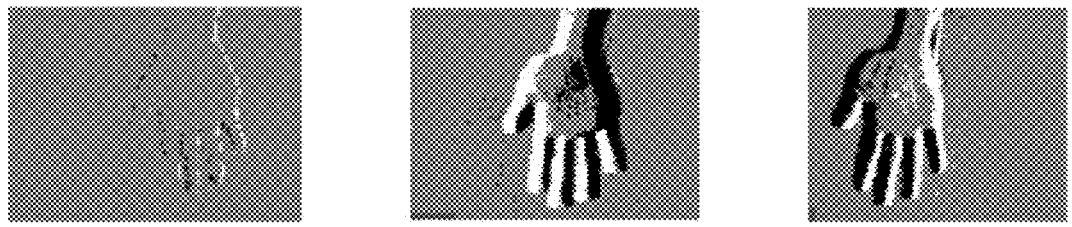
FIG. 14 is an application scenario view of a dynamic vision sensor of another embodiment of a present application.

Referring to FIG. 6, a dynamic vision camera is shown. The dynamic vision camera 1000 includes a second DVS 3 and a processor 4. The second DVS 3 is configured to output one or more event signals to the processor 4 according to the polychromatic light reflected by the color subject to be captured. The processor 4 is configured to generate spectral information according to the one or more event signals, and generate an image of the color subject to be captured according to the spectral information and position information of the color subject to be captured. The processor 4 is further configured to generate a dynamic video of the color subject to be captured (as shown in FIG. 14) according to one or more generated images of the color subject to be captured. Where, the processor 4 is configured to generate the spectral information which is the bright point according to the positive event signal, and generate the spectral information which is the dark point according to the negative event signal.

Figure 7:
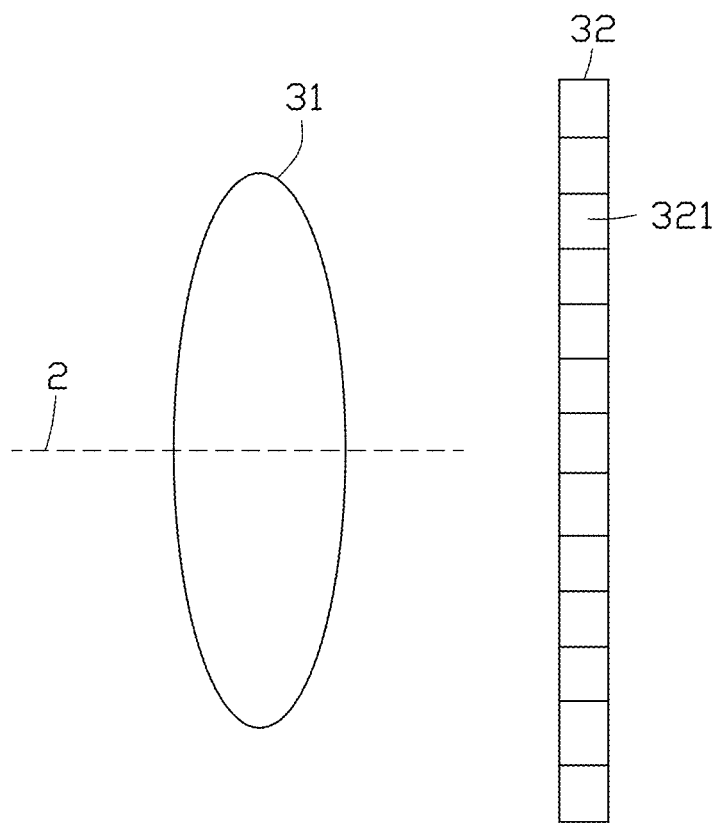
FIG. 7 is a schematic structural view of a dynamic vision sensor of an embodiment of a present application.
Figure 8:
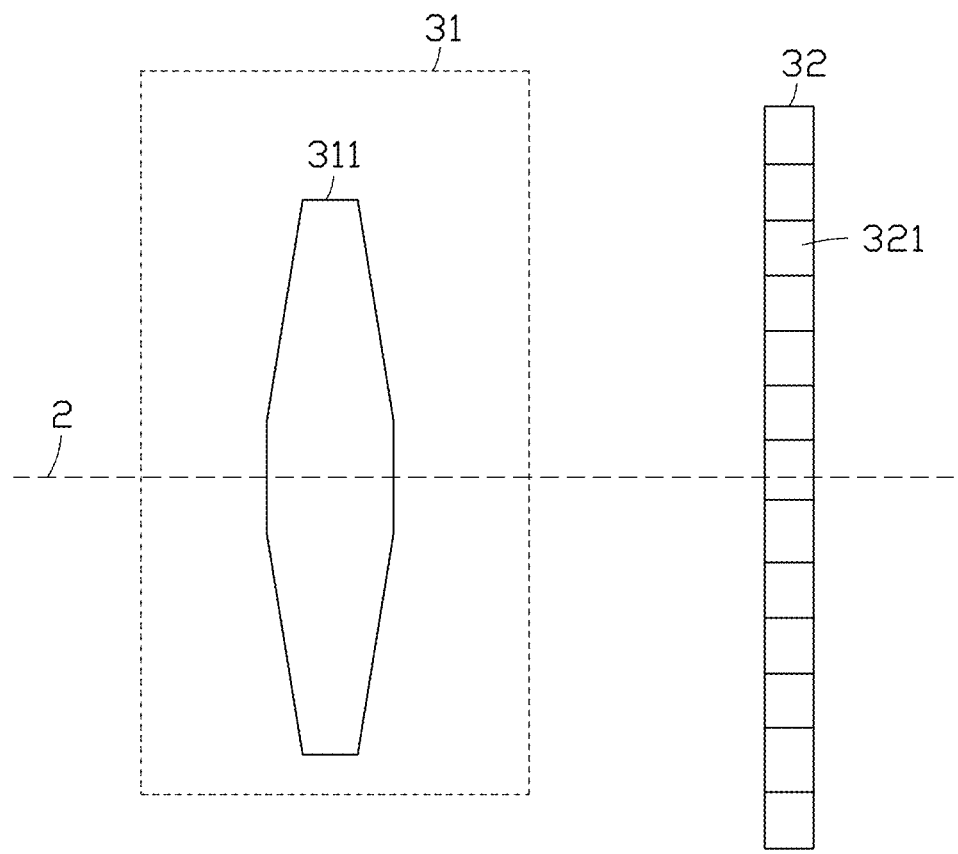
FIG. 8 is a schematic structural view of a dynamic vision sensor of another embodiment of a present application.

Referring to FIG. 7, a second DVS is shown. The second DVS 3 includes a dispersion lens 31 and a second sensor 32. The second sensor 32 includes a number of second pixels 321. The dispersion lens 31 is configured to disperse an incident polychromatic light into the monochromatic lights with different colors. The dispersion lens 31 and the second sensor 32 are orderly arranged along an incident optical axis of the polychromatic light. Thus, different monochromatic lights form the blur circles on the sensor 32, and areas of the blur circles have different sizes on the second sensor 32. The size of the area of the blur circle formed by each monochromatic light is greater than or equal to a size of an area of the second pixel. For example, the size of the area of the blur circle formed by the blue monochromatic light is the area of one second pixel, the size of the area of the blur circle formed by the green monochromatic light is the area of four second pixels 321, and the size of the area of the blue circle formed by the red monochromatic light is the area of nine second pixels 321. The size of the area of the second pixel can be obtained from the parameters of the second sensor 32. In some embodiments, referring to FIG. 8, the dispersion lens 31 includes the second prism 311. In some embodiments, referring to FIG. 9, the dispersion lens 31 includes the second prism 311, the second concave lens 312, and the third prism 313. Where the second prism 311, the second concave lens 312, and the third prism 313 are orderly arranged along an incident optical axis 2 of the incident polychromatic light.

Figure 9:
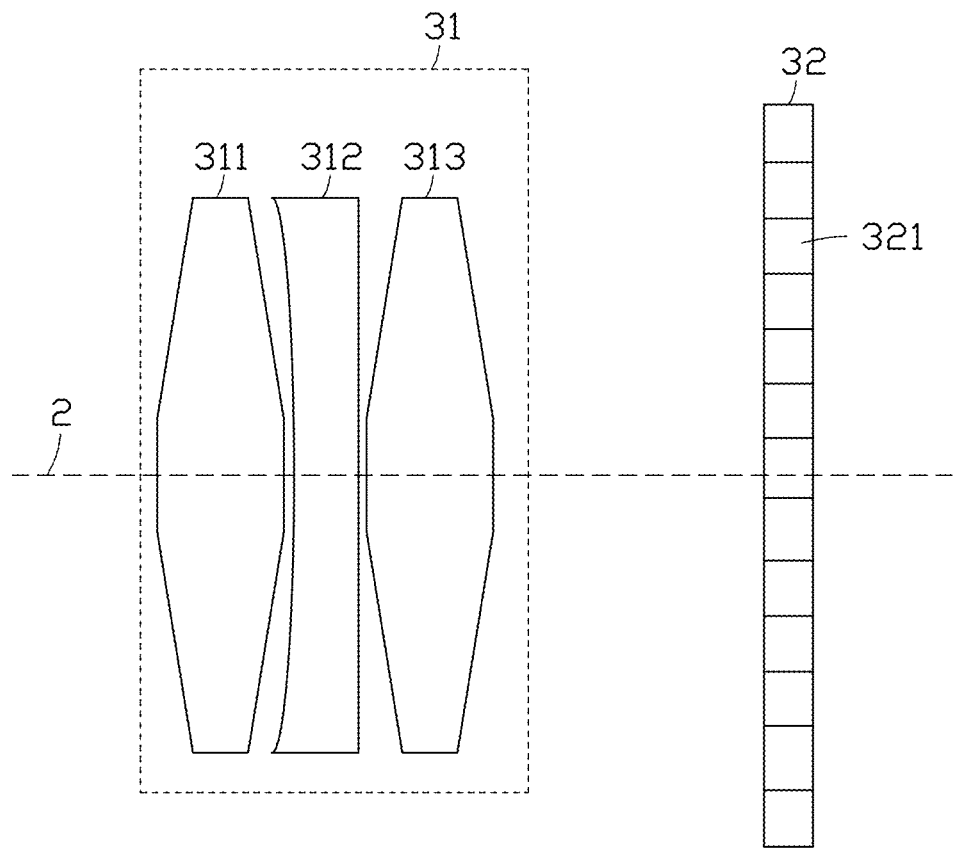
FIG. 9 is a schematic structural view of a dynamic vision sensor of another embodiment of a present application.
Figure 10:
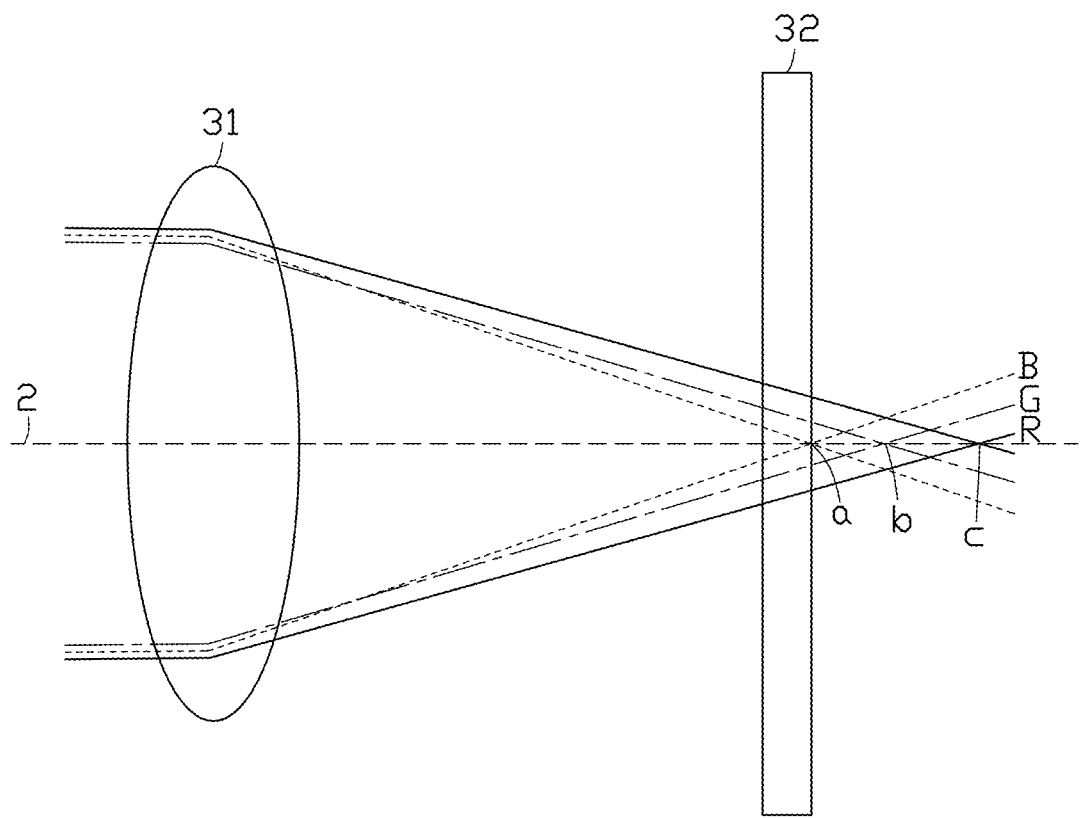
FIG. 10 is an application scenario view of a dynamic vision sensor of an embodiment of a present application.

Referring to FIG. 10, FIG. 10 is an application scenario view of the second DVS of an embodiment of the instant application. In this application scenario, when the second DVS 3 captures a certain color subject to be captured, the polychromatic light reflected from the junction area of different colors of the color subject to be captured enters into the second DVS 3. The polychromatic light includes three monochromatic lights, respectively the red monochromatic light, the green monochromatic light, and the blue monochromatic light. The polychromatic light passes through the dispersion lens 31 along a direction of the incident optical axis 2. The dispersion lens 31 concentrates the blue monochromatic lights to a position a, and forms an imaging point of the blue monochromatic lights at the position a. The dispersion lens 31 concentrates the green monochromatic lights to a position b, and forms an image point of the green monochromatic lights at the position b. The dispersion lens 31 concentrates the red monochromatic lights to a position c, and forms an image point of the red monochromatic lights at the position c. Namely, the monochromatic lights dispersed by the dispersion lens 31 form the longitudinal chromatic aberration. Thus, the monochromatic lights with different colors dispersed from the polychromatic light can form blur circles with different sizes of the areas on the second sensor 32. Namely, the energies of the monochromatic lights with different colors dispersed from the polychromatic light can be distributed onto different number of the second pixels 321 of the second sensor 32 (as shown in FIG. 9).

It can be understood that, the size of the area of the blur circle is determined according to a wavelength of the monochromatic light and the aperture of the second DVS 3. The wavelengths of the monochromatic lights with different colors are different. Thus, in one and the same second DVS 3, the dispersion lens 31 disperses the incident polychromatic light into the monochromatic lights with different colors. After arranging the second sensor 32 along the incident optical axis 2, the monochromatic light with different colors can form blur circles with different sizes of the areas on a receiving surface of the second sensor 32.

Referring back to FIG. 7, the second sensor 32 is configured to output a first event signal according to a variation of the energy corresponding to the variation of a kind of the blur circle. Where the kind of the blur circle is determined according to the size of the area of the blur circle. For example, the blur circle with a size being the area of one second pixel is a first kind of the blur circle, the blur circle with the size being the area of four second pixels 321 is a second kind of the blur circle, and the blur circle with the size being the area of nine second pixels 321 is a third kind of the blur circle.

It can be understood that, the second DVS 3 includes the dispersion lens 31 and the second sensor 32. The dispersion lens 31 and the second sensor 32 are orderly arranged along the incident optical axis of the polychromatic light. The monochromatic lights with different colors dispersed by the dispersion lens 31 can form the blur circles with different sizes of the area on the second sensor 32. The blur circles with the same size of the area are a kind of blur circle. The color subject to be captured includes the junction area of different colors and an individual color area. When the color subject to be captured moves, a first number of the kind of the blur circle is different from a second number of the kind of the blur circle. The first number of the kind of the blur circle is formed on the second sensor 32 by the polychromatic light reflected from the junction area of different colors. The second number of the kind of the blur circle is formed on the second sensor 32 by the monochromatic light reflected from the individual color area. Namely, the number of the kind of the blur circle received by the second sensor 32 can be changed. The second sensor 32 outputs a second event signal according to the variation of the number of the kind of the blur circle, thus the dynamics of the color subject to be captured can be captured.

In some embodiments, the second sensor 32 includes second pixels 321. Each second pixel 321 is configured to output the second event signal according to the variation of the energy corresponding to the variation of the number of the kind of the blur circle. Each second pixel 321 is further configured to output the positive event signal according to the variation of the energy corresponding to an increasing of the number of the kind of the blur circle. Each second pixel is further configured to output the negative event signal according to the variation of the energy corresponding to a decreasing of the number of the kind of the blur circle.

Figure 11A:
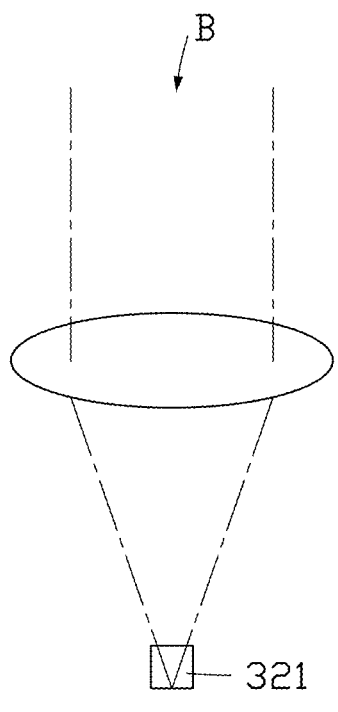
FIG. 11A, FIG. 11B, and FIG. 11C are application scenario views of a dynamic vision sensor of another embodiment of a present application.
Figure 11B:
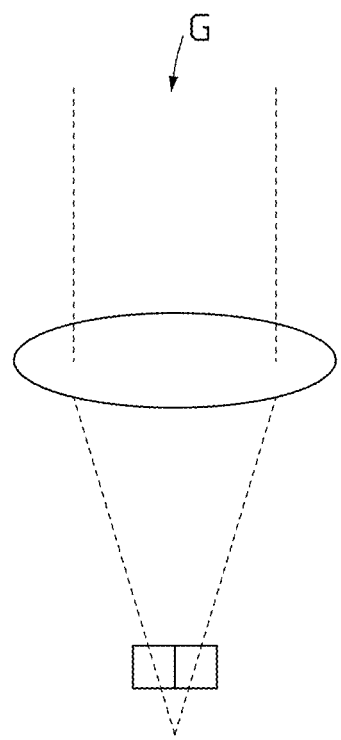
Figure 11C:
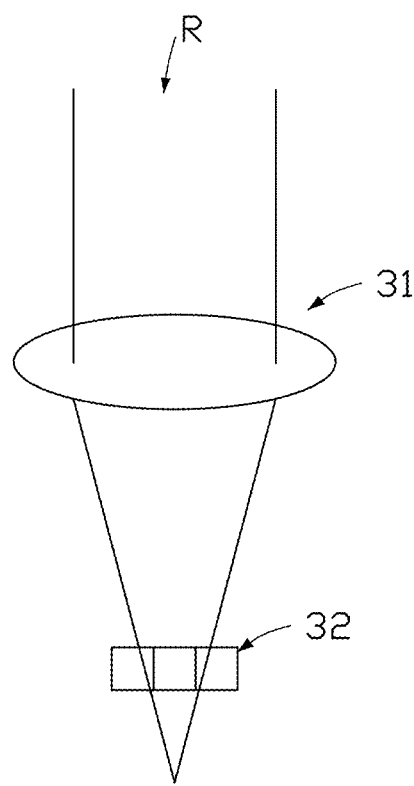

In one embodiment, in FIG. 11A, the energy of the blue monochromatic light of the polychromatic light shown in the application scenario of the FIG. 10 is distributed onto one second pixel 321, namely, the blue monochromatic light forms the blur circle, and the size of the blur circle is the area of the one second pixel 321 on the second sensor 32. In FIG. 11B, the energy of the green monochromatic light of the polychromatic light is distributed onto four adjacent second pixels 321 (because the applicant scenario shown in the FIG. 11B is a two-dimensional image, two adjacent second pixels 321 are shown in the FIG. 11B, but in actual four adjacent second pixels 321 are existed), namely, the green monochromatic light forms the blur circle, and the size of the blur circle is the area of the four pixels on the second sensor 32. In FIG. 11C, the energy of the red monochromatic light of the polychromatic light is distributed onto nine second pixels 321 (because the applicant scenario shown in the FIG. 11C is a two-dimensional image, three adjacent second pixels 321 are shown in the FIG. 11C, but in actual nine adjacent second pixels 321 are existed), namely, the red monochromatic light forms the blur circle, and the size of the blur circle is the area of the nine pixels on the second sensor 32. Thus, each second pixel 321 of the second sensor 32 receives different energies at different time when a corresponding second pixel 321 of the second sensor 32 receives monochromatic lights with different colors at different time. For example, the energy of the monochromatic light is N, thus the energy of the blue monochromatic light received by a single second pixel 321 is N, the energy of the green monochromatic light received by the single second pixel 321 is N/4, and the energy of the red monochromatic light received by the single second pixel 321 is N/9.

Figure 12:
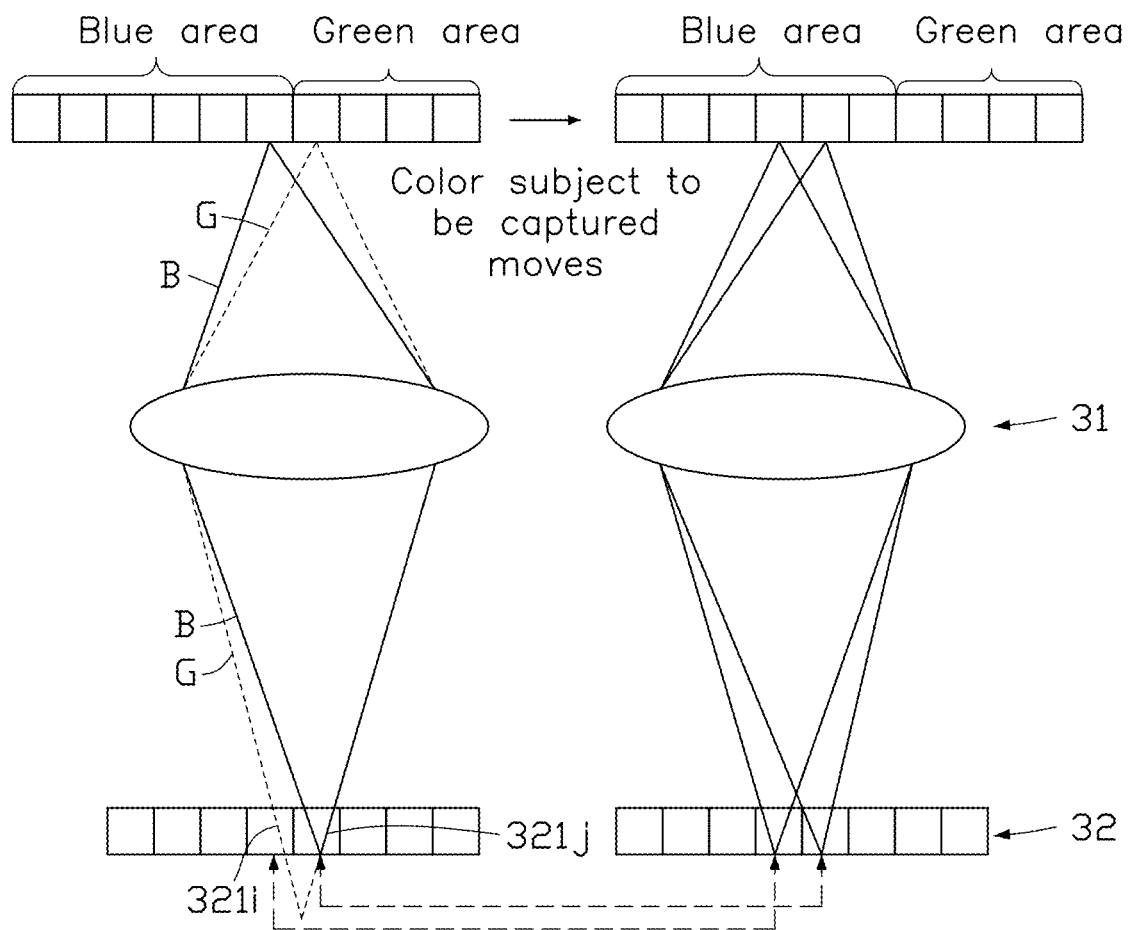
FIG. 12 is an application scenario view of a dynamic vision sensor of another embodiment of a present application.

When the color subject to be captured moves, the kind of the monochromatic light received by the one and the same second pixel 321 may be changed, namely, the number of the kind of the blur circle received by the one and the same second pixel 321 may also be changed. Referring also to FIG. 12, the second sensor 32 of the second DVS includes a second pixel 321 at the i position (hereinafter a second pixel 321$i$) and a second pixel 321 at the j position (hereinafter a second pixel 321$j$). The positive threshold of the second pixel 321$i$ is N/3, the negative threshold of the second pixel 321$i$ is N/9, the positive threshold of the second pixel 321$j$ is N/2, and the negative threshold of the second pixel 321$j$ is N/10. The color subject to be captured includes the blue area and the green area. When the color subject to be captured is at the first position, the light is irradiated to the color subject to be captured. The light reflected from the junction area of different colors of the color subject to be captured is the polychromatic light. In detail, the light reflected from the blue area is the blue monochromatic light B, and the light reflected from the green area is the green monochromatic light G. The blue monochromatic light B and the green monochromatic light G from the polychromatic light. The polychromatic light enters into the second sensor 32. The second pixel 321$i$ of the second sensor 32 receives the blur circle formed by the green monochromatic light G. Namely, the second pixel 321$i$ of the second sensor 32 receives the energy corresponding to the blur circle formed by the green monochromatic light G is N/4. The second pixel 321$j$ of the second sensor 32 receives the blur circle formed by the green monochromatic light G and the blur circle formed by the blue monochromatic light B. Namely, the second pixel 321$j$ of the second sensor 32 receives the energy corresponding to the blur circle formed by the green monochromatic light G is N/4 and the energy corresponding to the blur circle formed by the blue monochromatic light B is N. Thus, the second pixel 321$j$ receives two kinds of blue circles in total and receives the energy 5N/4.

When the color subject to be captured moves to the second position, the light is irradiated to the color subject to be captured. The light reflected from the individual color area of the color subject to be captured is the monochromatic light. In detail, the light reflected from the blue area is the blue monochromatic light B, thus the blue monochromatic light B enters into the second DVS. At the moment, the second pixel 321$i$ and the second pixel 321$j$ each receives the blur circle formed by the blue monochromatic light B, and each receives the energy N.

When the color subject to be captured moves from the first position to the second position, the energy received by the second pixel 321$i$ increases from the energy N/4 to the energy N. During the increasing of the energy, the variation value 3N/4 of the increasing energy is greater than the positive threshold N/3, the second pixel 321$i$ outputs the positive event signal. When the color subject to be captured moves from the first position to the second position, the energy received by the second pixel 321$j$ decreases from the energy 5N/4 to the energy N. During the decreasing of the energy, the variation value N/4 of the decreasing energy is greater than the negative threshold N/10, the second pixel 321$j$ outputs the negative event signal. Namely, the second pixel 321 is further configured to output the negative event signal when the decreasing of the energy corresponding to the decreasing of the number of the kind of the blur circle is greater than the negative threshold. It can be understood that, the second pixel 321 is further configured to output the positive event signal when the increasing of the energy corresponding to the increasing of the number of the kind of the blur circle is greater than the positive threshold, the disclosure is not limited herein.

It can be understood that, the energies formed on the pixels by the junction of the blue monochromatic light and the green monochromatic light (namely when the color subject to be captured is at the first position, the energies received by the second pixel 321$i$ and the second pixel 321$j$) are respectively different from the energies formed on the pixels by the blue monochromatic light (namely when the color subject to be captured is at the second position, the energy received by the second pixel 321$i$ and the energy received by the second pixel 321$j$) or the energies formed on the pixels by the green monochromatic light. When the color subject to be captured moves from the first position to the second position, the energy received by the second pixel 321*i* and the energy received by the second pixel 321*j* each is changed. Thus, the first event signal can be outputted according to the variation of the energy corresponding to the variation of the kind of the blur circle or further according to the threshold. Thus, the processor 4 (as shown in FIG. 6) generates a data cube (x, y, λ) according to one-dimensional spectral information (λ) and two-dimensional position information (x, y) of the color subject to be captured. The one-dimensional spectral information (λ) is generated according to the positive event signal or the negative event signal. The processor 4 further generates a spectral curve of the color subject to be captured according to the data cube (x, y, λ), and generate the image of the color subject to be captured according to the spectral curve. In some embodiments, the processor 4 further generates the dynamic video of the color subject to be captured according to a sequence of images. Where, the processor 4 generates the one-dimensional spectral information (λ) which is the bright point according to the positive event signal. The processor 4 further generates the one-dimensional spectral information (λ) which is the dark point according to the negative event signal.

It can be understood that, because the sizes of the areas of the blur circles formed by the monochromatic lights with different colors are different, the energy formed on the pixel by the monochromatic lights with different colors is different from the energy formed on the pixel by the single monochromatic light. For example, as shown in the FIG. 12, the energy formed on the second pixel 321*j* by the polychromatic light reflected from the junction area with different colors is greater than the energy formed on the second pixel 321*j* by the blue monochromatic light reflected from the blue area. Thus, when the color subject to be captured moves from the first position to the second position, the energy received by the second pixel 321*j* is decreased, and the second pixel 321*j* outputs the negative event signal. The processor 4 generates the spectral information (λ) which is a dark point according to the negative event signal, thus the dynamics of the color subject to be captured can be captured.

It can be understood that, the color subject to be captured includes the junction area of different colors and the individual color area. When the color subject to be captured moves, the first number of the kind of the blur circle is different from the second number of the kind of the blur circle. The first number of the kind of the blur circle is formed on the second pixel 321*j* by the polychromatic light reflected from the junction area of different colors. The second number of the kind of the blur circle is formed on the second pixel 321*j* by the monochromatic light reflected from the individual color area. Namely, the number of the kind of the blur circle received by the second pixel 321*j* can be changed. The variation of the number of the kind of the blur circle may cause the variation of the energy. The second pixel 321*j* outputs the second event signal according to the variation of the energy. Thus, the dynamics of the color subject to be captured can be captured.

It can be understood that, when the second pixel 321*i* moves from the first position to the second position, the energy received by the second pixel 321*i* changes. However, the second pixel 321*i* outputs the first event signal according to the variation of the energy corresponding to the variation of the kind of the blur circle. Thus, the second pixel 321*i* outputs the first event signal according to the variation of the energy corresponding to the variation of the kind of the blur circle, and the second pixel 321*j* outputs the second event signal according to the variation of the energy corresponding to the variation of the number of the kind of the blur circle. Moreover, the variation of the number of the kind of the blur circle is a particular variation in the variation of the kind of the blur circle. The particular variation can be, for example, the variation of the number of the kind of the blur circle. Thus, the variation of the energy corresponding to the variation of the kind of the blur circle includes the variation of the energy when the second pixel 321*i* moves from the first position to the second position and the variation of the energy when the second 321*j* moves from the first position to the second position.

Figure 13:
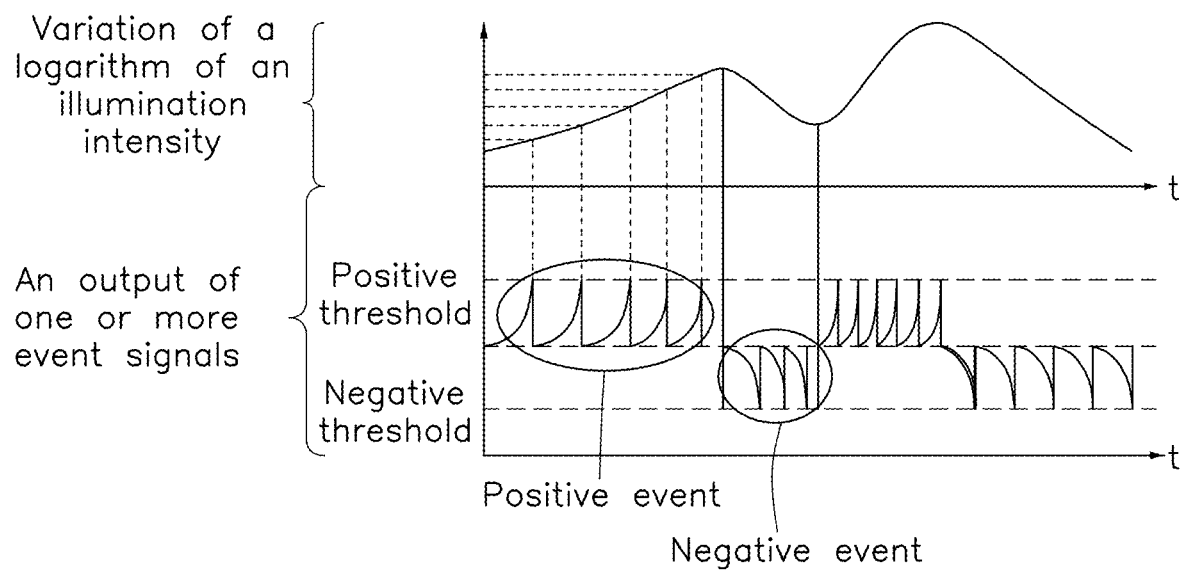
FIG. 13 is a view showing an output of one or more event signals by a pixel of a dynamic vision sensor of an embodiment of a present application.

In some embodiments, referring to FIG. 13, an output of the event signals by a certain second pixel 321 is shown. An upper part of the FIG. 13 is the variation of a logarithm log(x, t) of the illumination intensity of the second pixel 321. A lower part of the FIG. 13 is the output of the event signals mapped according to the variation of the logarithm log(x, t) of the illumination intensity of the second pixel 321. x is the two-dimensional position information of the color subject to be captured, t is the time, and a longitudinal axis of the upper part of the FIG. 13 is the energy. FIG. 13 shows that, one second pixel dynamic receives one or more kinds of the monochromatic lights. When the kind of the monochromatic light received by one second pixel increases, namely when the kind of the blur circle received by the one second pixel increases, the energy is increased in a positive gradient manner. If the increasing of the energy is greater than the positive threshold, the second pixel outputs the positive event signal. When the kind of the monochromatic light received by the one second pixel decreases, namely when the kind of the blur circle received by the one second pixel decreases, the energy is decreased in a negative gradient manner. If the decreasing of the energy is greater than the negative threshold, the second pixel outputs the negative event signal. The processor can generate the one-dimensional spectral information (λ) which is the bright point according to the positive event signal. The processor can further generate the one-dimensional spectral information (λ) which is the dark point according to the negative event signal. The processor can further generate a dynamic video of the color subject to be captured according to the two-dimensional position information (x, y) of the color subject to be captured and the one-dimensional spectral information (λ) including one or more bright points and/or one or more dark points. A part of the dynamic video is shown in FIG. 14.

It can be understood that, when the color subject to be captured moves, the number of the kind of the blur circle received by a certain second pixel can change, thus the energy received by the certain second pixel can also change. Thus, a sequence of the positive event signals or a sequence of the negative event signals can be generated, or an alternation of the positive event signal and the negative event signal can be generated. The processor 4 can generate a dynamic spectral curve of the color subject to be captured according to a sequence of event signals.

It can be understood that, the second DVS includes the dispersion lens. The dispersion lens is configured to disperse the polychromatic light entered into the second DVS into the monochromatic lights with different colors. The dispersion lens and the second sensor are orderly arranged along an incident optical axis of the incident polychromatic light, and are spaced at a preset distance. Thus, the imaging points formed by the monochromatic lights with different colors along the direction of the incident optical axis are at different positions, namely the monochromatic lights dispersed by the dispersion lens form the longitudinal chromatic aberration.

Because the longitudinal chromatic aberration is existed between the monochromatic lights with different colors, the sizes of the areas of the blur circles corresponding to the monochromatic lights with different colors received by the one second pixel of the second sensor at the direction of the incident optical axis are different. When the color subject to be captured moves, each blur circle with a size of the area move with the corresponding monochromatic light, the kind of the blur circle received by the second pixel can increase or decrease, for example, when the color subject to be captured moves to a position where the second pixel receives the polychromatic light reflected from the junction area of different colors, the kind of the blur circle received by the second pixel may increase, thus the received energy by the second pixel is increased. When the color subject to be captured moves to another position where the second pixel receives the monochromatic light reflected from the individual color area, the kind of the blur circle received by the second pixel may decrease, thus the received energy by the second pixel is decreased. The second pixel outputs the positive event signal according to the increasing energy. The second pixel outputs the negative event signal according to the decreasing energy. In some embodiments, the second pixel outputs the positive event signal according to the increasing of the energy being greater than a positive threshold. The second pixel outputs the negative event signal according to the decreasing of the energy being greater than a negative threshold. Thus, the second pixel can capture the variation of the monochromatic lights with different colors according to the dynamic kinds of the blur circles. Thereof, the dynamics of the junction area of different colors of the color subject to be captured can be captured by the second DVS.

Figure 15:
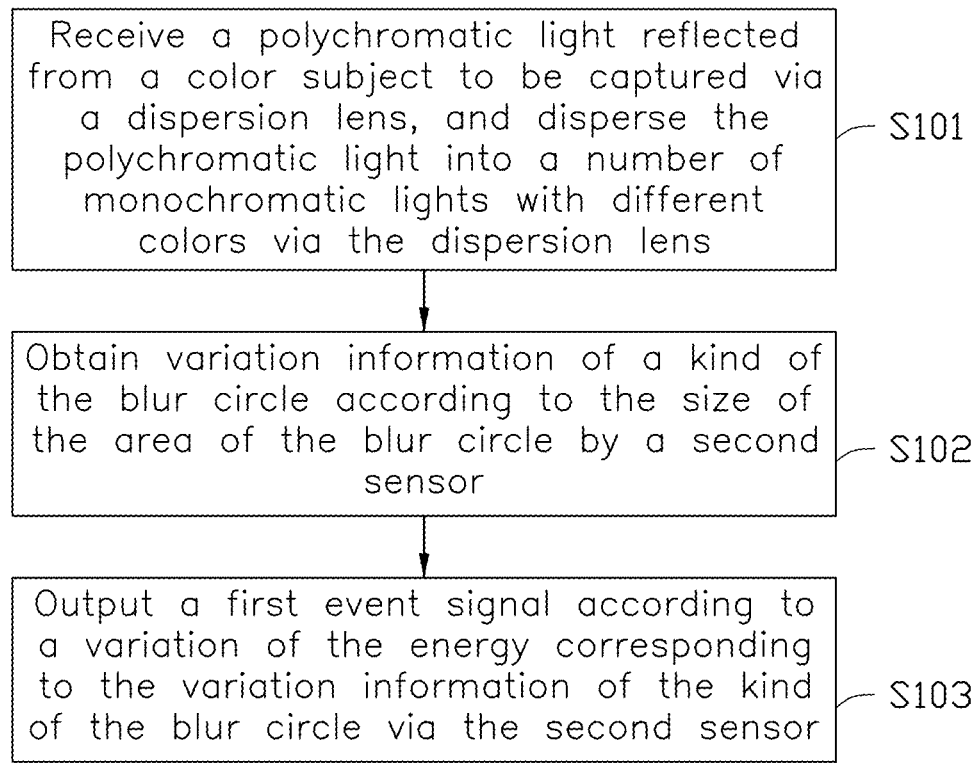
FIG. 15 is a flowchart of a method for sensing dynamic vision of an embodiment of a present application.

Referring to FIG. 15, a method for sensing dynamic vision is shown. The method is applied on a DVS. The DVS includes the dispersion lens and the second sensor. The method is applied on the processor 4. The method includes:

S101, receiving a polychromatic light reflected from the color subject to be captured via a dispersion lens, and dispersing the polychromatic light into a number of monochromatic lights with different colors via the dispersion lens; where the monochromatic lights with different colors forms the blur circles with different sizes of the areas on the second sensor.

S102, obtaining variation information of a kind of the blur circle according to the size of the area of the blur circle by the second sensor.

S103, outputting a first event signal according to a variation of the energy corresponding to the variation information of the kind of the blur circle via the second sensor.

It can be understood that, the DVS, the method for sensing dynamic vision, and the dynamic vision camera can also capture the dynamics of the black-and-white subject to be captured, the disclosure is not limited herein.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the implementation goes beyond the scope of this application. A person skilled in the art may clearly understand that, for the purpose of convenient and brief description, for a detailed working process of the system and apparatus described above, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms. The units described as separate parts may or may not be physically separate, and parts displayed as units may or may not be physical units, may be located in one location, or may be distributed on a plurality of network units. Some or all of the units may be selected based on an actual requirement to achieve the objectives of the solutions in the embodiments. In addition, functional units in the embodiments of this application may be integrated into one processing unit, or each of the units may exist alone physically, or two or more units are integrated into one unit. It should be noted that, the above are only preferred embodiments and applied technical principles of the present disclosure.

Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A dynamic vision sensor comprising a dispersion lens and a sensor, wherein:
   the dispersion lens is configured to disperse an incident polychromatic light into a plurality of monochromatic lights with different colors, the incident polychromatic light is reflected from a color subject to be captured, the monochromatic lights with different colors form a plurality of blur circles on the sensor, and areas of the blur circles have different sizes on the sensor; and
   the sensor is configured to output a first event signal according to a variation of an energy corresponding to a variation of a kind of one of the blur circles, where the kind of the one of the blur circles is determined according to one or more of the sizes of one or more of the areas of one or more of the blur circles, and different sizes of the areas of the blur circles correspond to different kinds of the blur circles, the sensor comprises a plurality of pixels, the size of the area of the one of the blur circles formed by each of the monochromatic lights is greater than or equal to a size of an area of one of the plurality of pixels.

2. The dynamic vision sensor according to claim 1, wherein:

each of the pixels is configured to output a second event signal according to a variation of an energy corresponding to the variation of a number of the kind of the one of the blur circles.

3. The dynamic vision sensor according to claim 2, wherein:
each of the pixels is further configured to output a positive event signal according to the variation of the energy corresponding to an increasing of the number of the kind of the one of the blur circles; and
each of the pixels is further configured to output a negative event signal according to the variation of the energy corresponding to a decreasing of the number of the kind of the one of the blur circles.

4. The dynamic vision sensor according to claim 3, wherein:
each of the pixels is further configured to output the positive event signal when an increasing of the energy corresponding to the increasing of the number of the kind of the one of the blur circles is greater than a positive threshold.

5. The dynamic vision sensor according to claim 3, wherein:
each of the pixels is further configured to output the negative event signal when a decreasing of the energy corresponding to the decreasing of the number of the kind of the one of the blur circles is greater than a negative threshold.

6. A dynamic vision camera comprising a dynamic vision sensor, the dynamic vision sensor being configured to output an event signal according to an incident polychromatic light reflected from a color subject to be captured, the dynamic vision sensor comprising a dispersion lens and a sensor, wherein:
the dispersion lens is configured to disperse an incident polychromatic light into a plurality of monochromatic lights with different colors, the incident polychromatic light is reflected from the color subject to be captured, the monochromatic lights with different colors form a plurality of blur circles on the sensor, and areas of the blur circles have different sizes on the sensor; and
the sensor is configured to output a first event signal according to a variation of an energy corresponding to a variation of a kind of one of the blur circles, where the kind of the one of the blur circles is determined according to one or more of the sizes of one or more of the areas of one or more of the blur circles, and different sizes of the areas of the blur circles correspond to different kinds of the blur circles, the sensor comprises a plurality of pixels, the size of the area of the one of the blur circles formed by each of the monochromatic lights is greater than or equal to a size of an area of one of the plurality of pixels.

7. The dynamic vision camera according to claim 6, wherein:
each of the pixels is configured to output a second event signal according to a variation of an energy corresponding to the variation of a number of the kind of the one of the blur circles.

8. The dynamic vision camera according to claim 7, wherein:
each of the pixels is further configured to output a positive event signal according to the variation of the energy corresponding to an increasing of the number of the kind of the one of the blur circles; and
each of the pixels is further configured to output a negative event signal according to the variation of the energy corresponding to a decreasing of the number of the kind of the one of the blur circles.

9. The dynamic vision camera according to claim 8, wherein:
each of the pixels is further configured to output the positive event signal when an increasing of the energy corresponding to the increasing of the number of the kind of the one of the blur circles is greater than a positive threshold.

10. The dynamic vision camera according to claim 8, wherein:
each of the pixels is further configured to output the negative event signal when a decreasing of the energy corresponding to the decreasing of the number of the kind of the one of the blur circles is greater than a negative threshold.

11. The dynamic vision camera according to claim 6, further comprising a processor, wherein:
the processor is configured to generate spectral information according to the event signal;
the processor is further configured to generate an image of the color subject to be captured according to the spectral information and position information of the color subject to be captured.

12. The dynamic vision camera according to claim 11, wherein:
the processor is further configured to generate the spectral information which is a bright point according to a positive event signal;
the processor is further configured to generate the spectral information which is a dark point according to a negative event signal.

13. A method for sensing dynamic vision applied on a dynamic vision sensor, the dynamic vision sensor is provided with a dispersion lens and a sensor, the method comprising:
receiving an incident polychromatic light reflected from a color subject to be captured and dispersing the incident polychromatic light into a plurality of monochromatic lights with different colors by a dispersion lens; where the monochromatic lights with different colors form a plurality of blur circles on the sensor, and areas of the blur circles have different sizes on the sensor; and
outputting a first event signal according to a variation of an energy corresponding to a variation of a kind of one of the blur circles by the sensor, where the kind of the one of the blur circles is determined according to one or more of the sizes of one or more of the areas of one or more of the blur circles, and different sizes of the areas of the blur circles correspond to different kinds of the blur circles;
wherein the sensor is provided with a plurality of pixels, and the size of the area of the one of the blur circles is greater than or equal to a size of an area of one of the pixels.

14. The method according to claim 13, wherein the method further comprises:
outputting a second event signal according to a variation of an energy corresponding to the variation of a number of a kind of the one of the blur circles by each of the pixels.

15. The method according to claim 14, wherein outputting the second event signal according to the variation of the energy corresponding to the variation of the number of the kind of the one of the blur circles by each of the pixels further comprises:

outputting a positive event signal according to the variation of the energy corresponding to an increasing of the number of the kind of the one of the blur circles; and outputting a negative event signal according to the variation of the energy corresponding to a decreasing of the number of the kind of the one of the blur circles.

16. The method according to claim 15, wherein outputting the positive event signal according to the variation of the energy corresponding to the increasing of the number of the kind of the one of the blur circles further comprises:

outputting the positive event signal when an increasing of the energy corresponding to the increasing of the number of the kind of the one of the blur circles is greater than a positive threshold.

17. The method according to claim 15, wherein outputting the negative event signal according to the variation of the energy corresponding to the decreasing of the number of the kind of the one of the blur circles further comprises:

outputting the negative event signal when a decreasing of the energy corresponding to the decreasing of the number of the kind of the one of the blur circles is greater than a negative threshold.

\* \* \* \* \*